Figure 1:
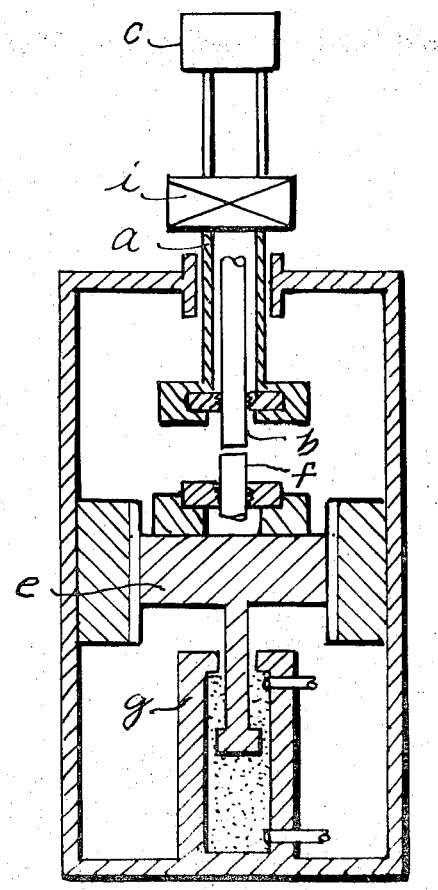

United States Patent [19]
Ishikawa et al.

[11] 3,775,834
[45] Dec. 4, 1973

[54] METHOD OF FRICTION WELDING AND APPARATUS THEREFOR

[75] Inventors: Yuji Ishikawa, Showa-ku, Nagoya; Mitsuhiro Numata, Kasugai-gun; Teruki Tomisiige, Nakamura-ku, Nagoya, all of Japan

[73] Assignee: Mitsubishi Jidosha Kogyo Kabushiki Kaisha, Tokyo, Japan

[22] Filed: Dec. 15, 1970

[21] Appl. No.: 98,432

[52] U.S. Cl. ............... 29/470.3, 156/73, 228/2
[51] Int. Cl. ............................................ B23k 27/00
[58] Field of Search ............... 228/2; 29/470.3; 156/73

[56] References Cited
UNITED STATES PATENTS
3,564,703  2/1971  Kiwalle .......................... 29/470.3
3,235,160  2/1966  Walton ............................ 228/2

Primary Examiner—J. Spencer Overholser
Assistant Examiner—R. J. Craig
Attorney—Cushman, Darby & Cushman

[57] ABSTRACT

An improved method of friction welding consisting of friction, correction, and upset steps, is disclosed. Said improvement exists in that during said correction step, as soon as the relative rotational speed between the respective bodies to be welded has been reduced to zero, at least one of said bodies to be welded is quickly rotated about the axis of said rotation by the amount falling within 0° to 360° in one direction to make correction of the relative angular position about said axis of rotation. In the preferred embodiment of the disclosure, the quick correction of relative angular position is achieved by means of a pair of positioning members having complementary configurations to mesh with each other, one being fixedly secured to one of the bodies to be welded, while the other being secured fixedly in the rotational direction but slidably in the axial direction relative to the other body to be welded.

6 Claims, 18 Drawing Figures

Fig. 3
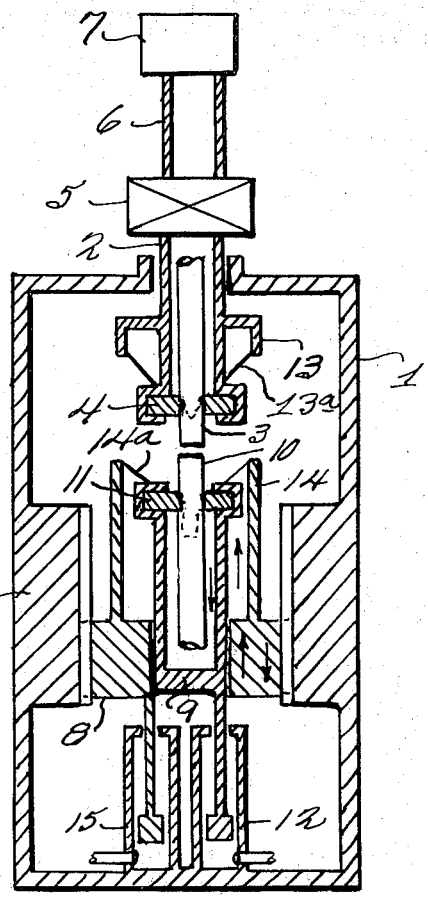
TO BE USED FOR COMPONENT PARTS
OF 180° SYMMETRY
DIRECTION OF CORRECTIVE ROTATION
TWO-WAY
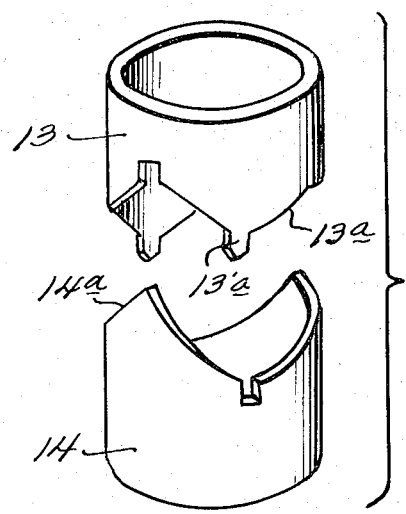
Fig. 4
INVENTORS
YUJI ISHIKAWA
MITSUHIRO NUMATA
TERUKI TOMISHIGE
BY Cushman, Darby & Cushman
ATTORNEYS

PUSHING FOR POSITIONING
CORRECTIVE ROTATION

—— DIRECTION OF CORRECTIVE ROTATION TWO-WAYS
--- DIRECTION OF CORRECTIVE ROTATION ONE-WAY

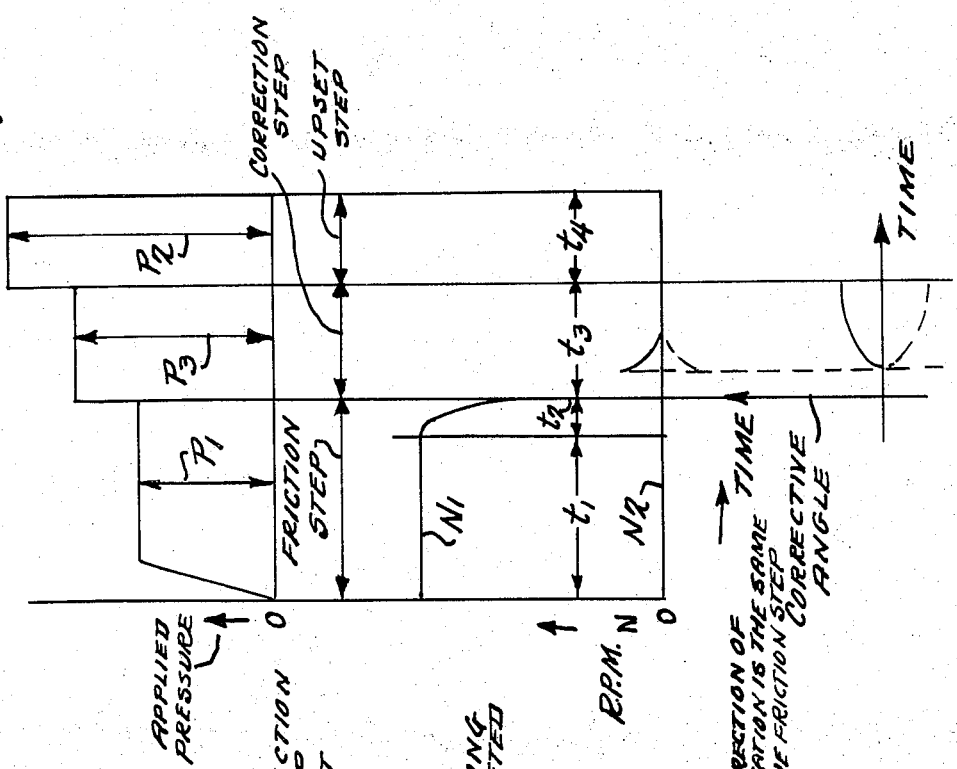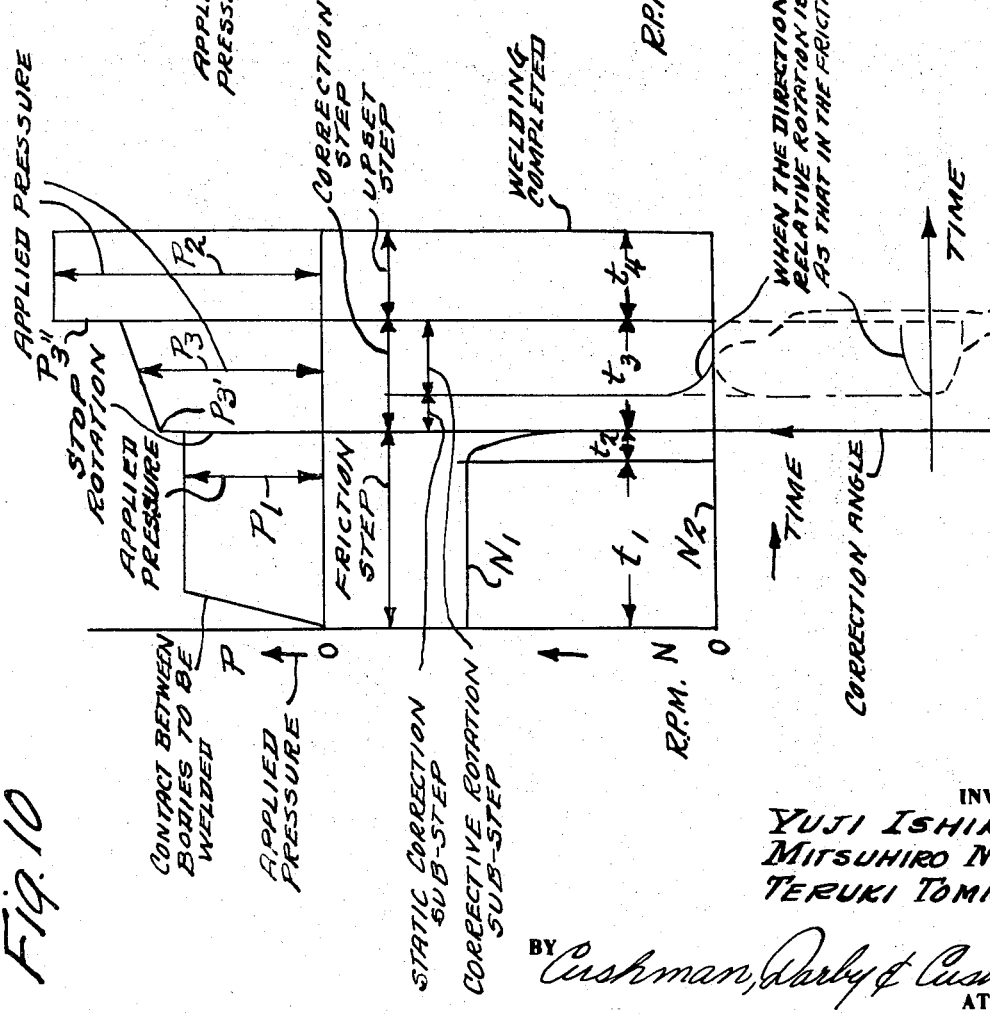

INVENTORS
YUJI ISHIKAWA
MITSUHIRO NUMATA
TERUKI TOMISHIGE

BY Cushman, Darby & Cushman
ATTORNEYS

METHOD OF FRICTION WELDING AND APPARATUS THEREFOR

The present invention relates to a method of friction welding in which two bodies to be welded together are brought into relative rotation and also pressed against each other to achieve the welding by making use of the friction heat generated at their contact portions, and also to an apparatus for practicing the same method.

Heretofore, in a friction welding machine, one of the bodies to be welded is rotated as by means of a prime motor while the other body to be welded is pressed against said one body in the direction of the rotational axis as by means of a hydraulic device, and when the friction heat generated at the contact portions of said bodies has accumulated up to a predetermined amount enough to meld the contact portions for welding them together, the relative rotation between the bodies is suddenly ceased to weld them together. However, since the period of stopping the relative rotation is very short in the order of 0.2 to 1 sec., it was substantially difficult from a practical point of view to correctly position said two bodies about the rotational axis so as to take a desired relative angular position. Therefore, by means of a friction welding machine in the prior art, it was difficult to join two bodies to be welded in a predetermined relative position, and consequently, it was applicable only for such bodies that the relative angular position between said bodies to be welded is not so important, and thus the scope of application of the friction welding machine in the prior art was extremely limited.

One object of the present invention is to provide a novel method and apparatus for friction welding, which enables friction welding of two bodies to be welded at a predetermined relative position, by quickly carrying out the positioning operation of said bodies to be welded about their rotational axis, simultaneously with the reduction of the relative rotational speed of said two bodies to be welded to zero, and thereby broadens the scope where the friction welding is applicable.

Another object of the present invention is to provide a novel method of friction welding which has a high welding precision and a broad scope of application, by prolonging the period of correction step to be used for the positioning of said two bodies to be welded about their rotational axis.

Still another object of the present invention is to provide a novel apparatus for friction welding which comprises means having a long life and an inherent structure for reliably operating as positioning members for carrying out the positioning operation about the rotational axis of said two bodies to be welded after completion of the friction step.

Yet another object of the present invention is to provide a novel apparatus for friction welding comprising said positioning members which are stable in operation, free of strong impacts upon operation, precise in positioning and durable in long use.

According to one feature of the present invention, a novel method of friction welding is provided, in which after completion of the friction step for bringing the welding portions of two bodies to be welded into relative rotation under a pressured state to generate a heat, the relative rotational speed between said bodies to be welded is reduced to zero, and simultaneously therewith at least one of said bodies to be welded is rotated for correction within the scope of 0° to 360° as measured in either one direction, and thereafter said two bodies are welded together in a predetermined relative position through the upset step for pressing said bodies to be welded against with each other, whereby the scope of application of the friction welding may be broadened.

Also according to another feature of the present invention, there is provided the above featured type of method of friction welding, in which the period of the correction step is prolonged by maintaining the pressure applied during said correction step at a constant pressure value between zero and the pressure to be applied during said upset step except for the value used in said friction step.

According to still another feature of the present invention, there is provided a method of friction welding as featured in the second preceding paragraph, in which the period of the correction step is prolonged by varying the pressure applied during said correction step with the lapse of time in said correction step within the scope between zero and the pressure to be applied during said upset step.

Also according to a further feature of the present invention, there is provided an apparatus for friction welding which enables to reliably and efficiently practice said method of friction welding with a relatively simple structure, in which tooth profiles are formed on the opposed surfaces of a pair of positioning members respectively mounted on two bodies to be welded so as not to rotate relative to said bodies, and simultaneously with the reduction of the relative rotational speed between said two bodies to be welded to zero by the aid of brake means after completion of said friction step, at least one of said bodies to be welded is made free to rotate about the axis of said rotation while pushing one of said positioning members in the axial direction by the aid of pressure means, so that the rotation for correction may be achieved while engaging said both tooth profiles with each other, one sliding along the other, to position said bodies to be welded at predetermined positions for welding them together.

In addition, according to yet another feature of the present invention, there is provided novel positioning members to be used in the above-featured apparatus for friction welding, which have an inherent structure devised in such manner that the impact force upon engagement of said positioning members may be dispersed or relaxed to extremely weaken the impact force applied to said tooth profiles.

Figure 2:
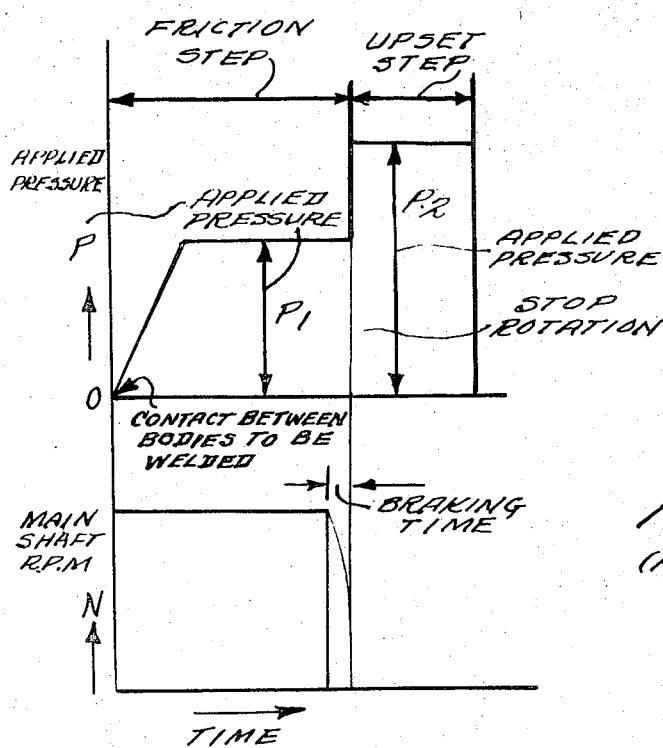
Figure 12:
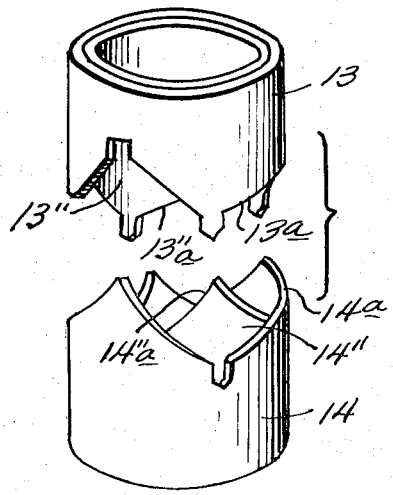
Figure 5:
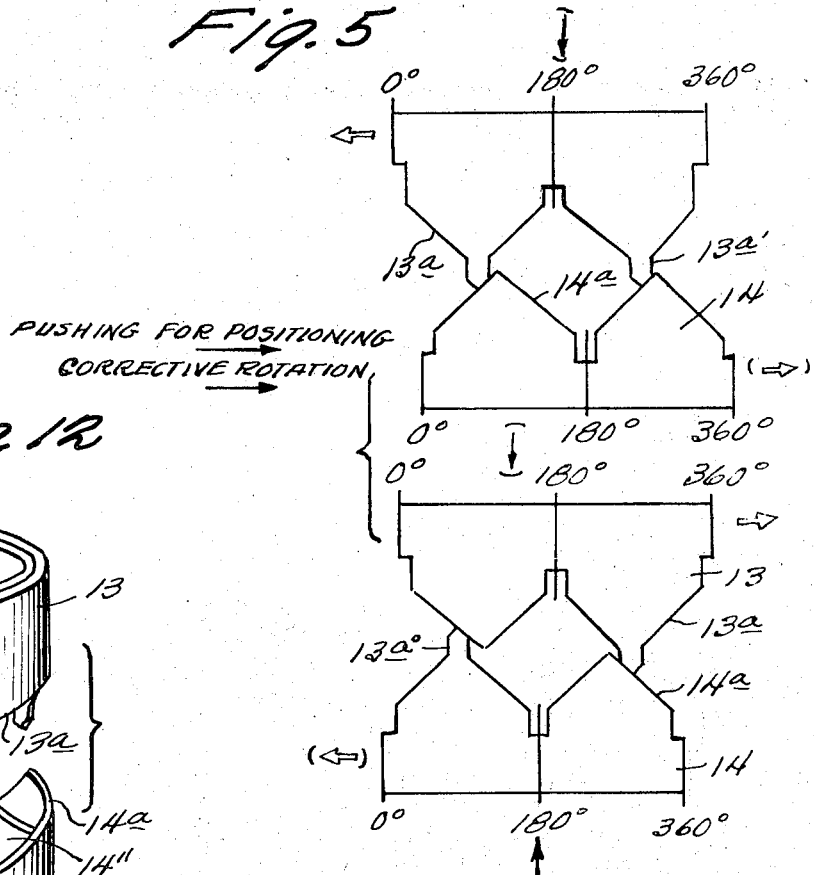
Figure 13:
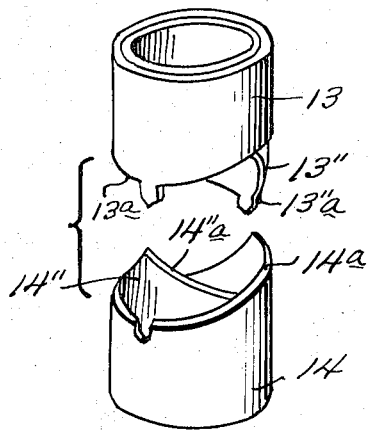
Figure 6:
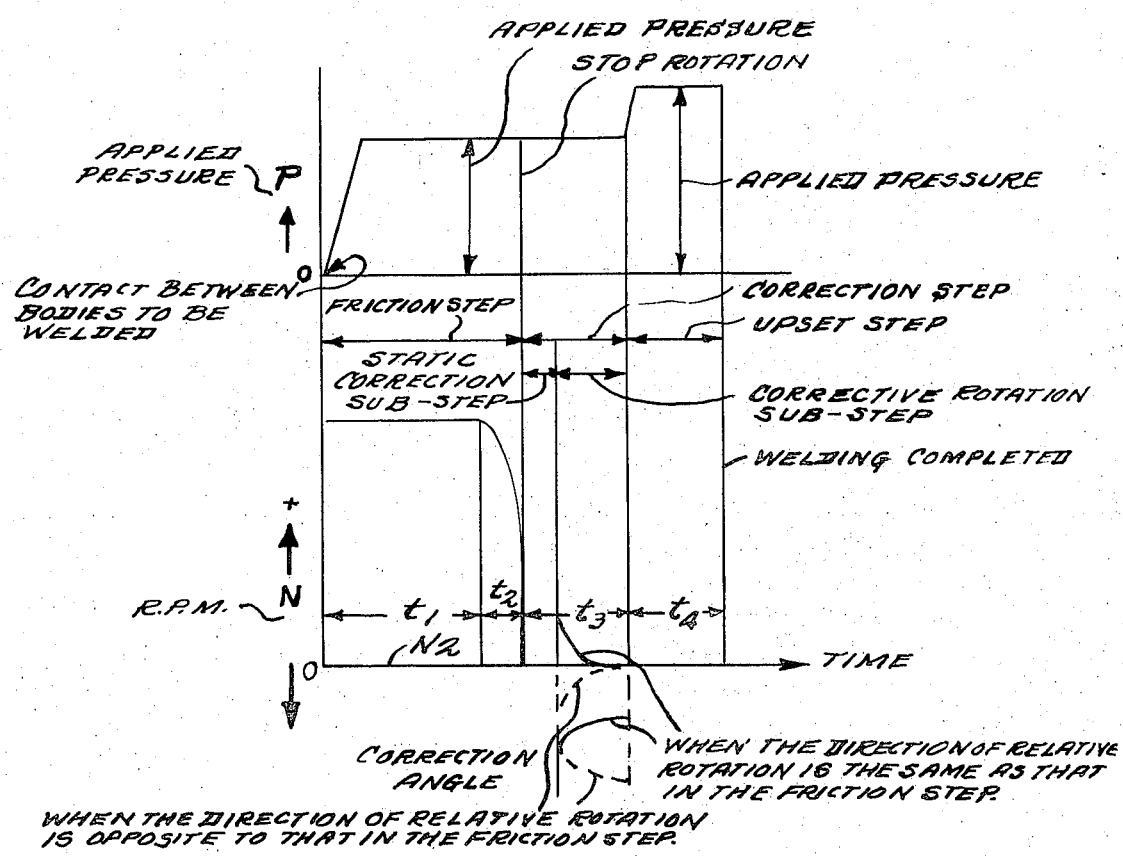
Figure 7:
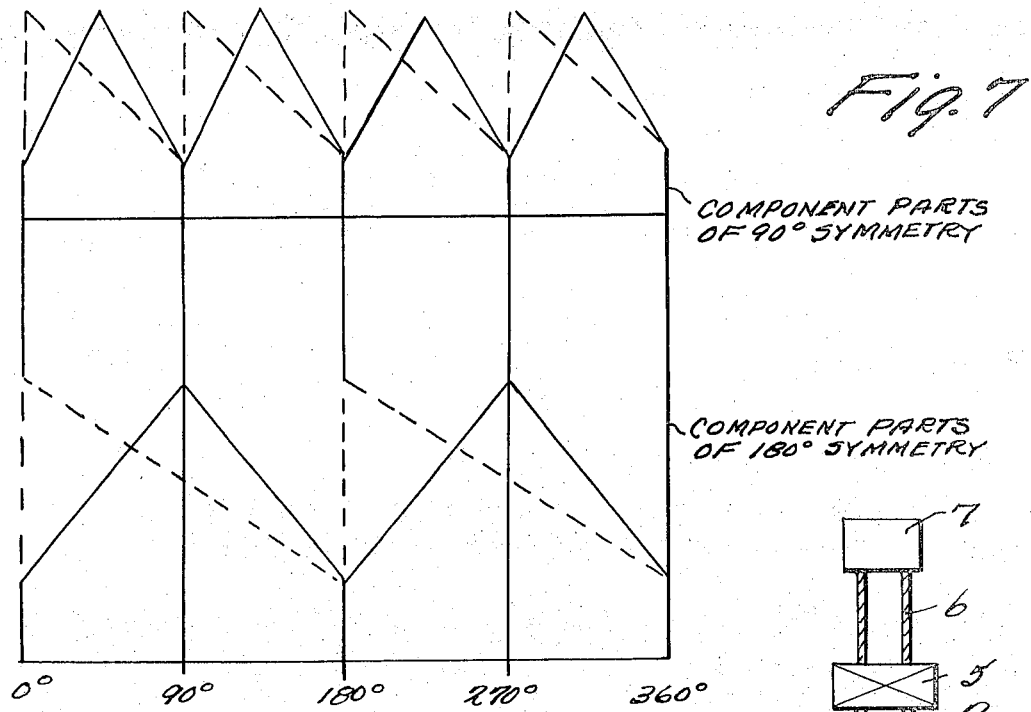
Figure 8:
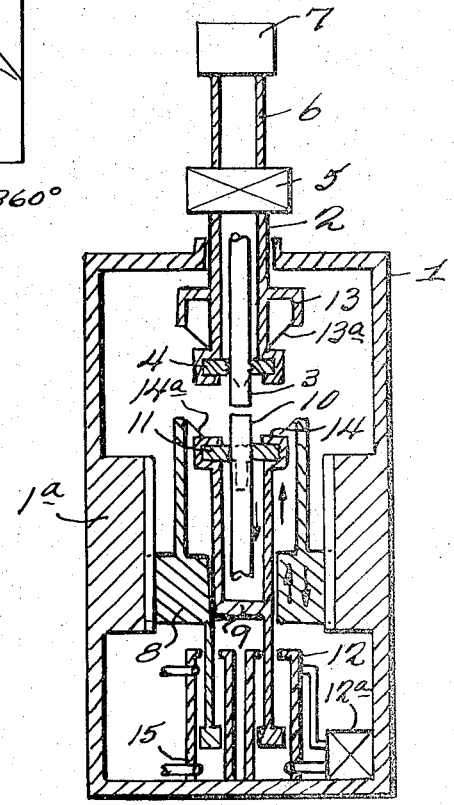
Figure 14:
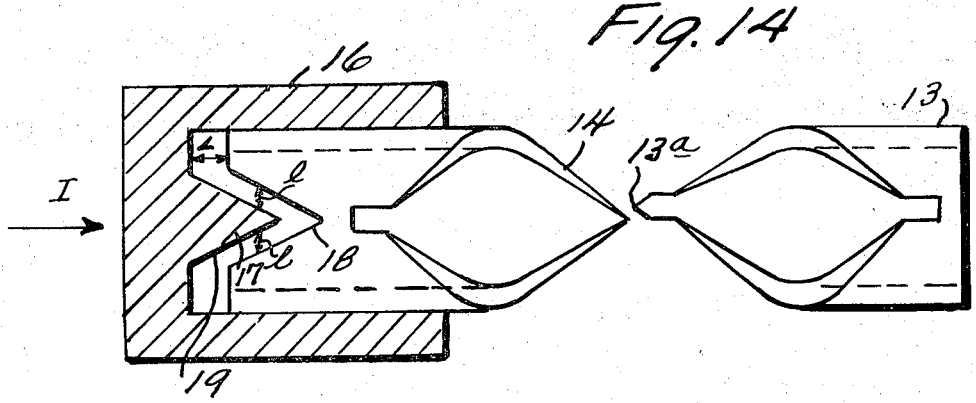
Figure 15:
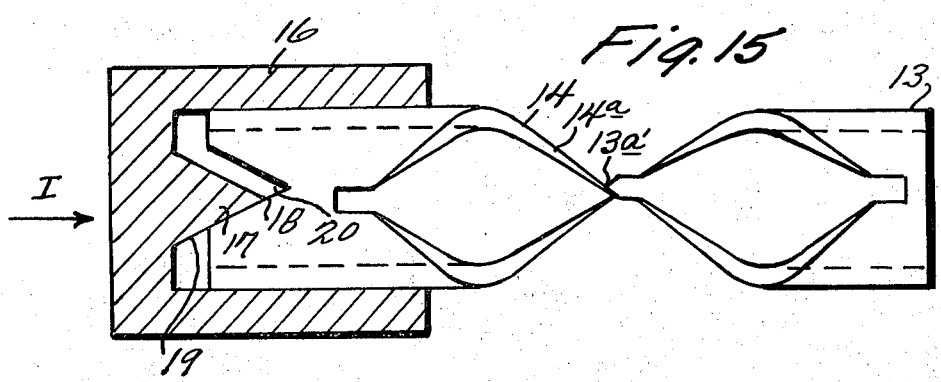
Figure 17:
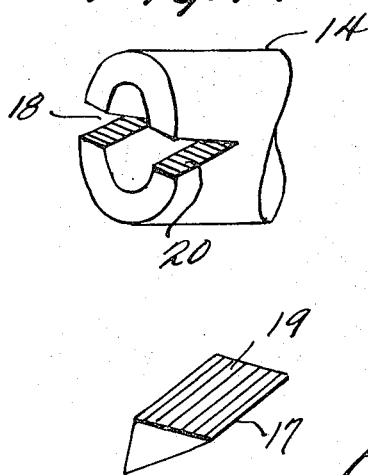
Figure 16:
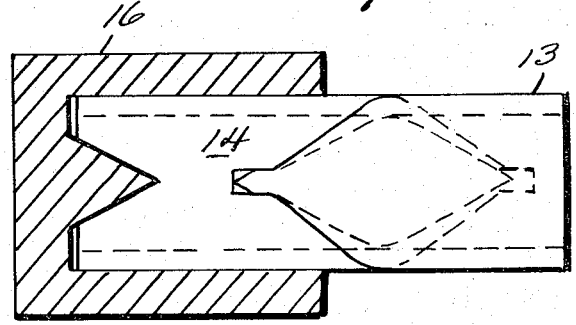
Figure 18:
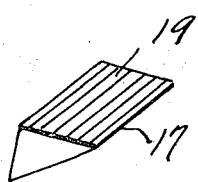

These and other features and advantages of the present invention will become apparent upon a perusal of the following specification taken in connection with the accompanying drawings wherein:

FIG. 1 is a longitudinal cross-section view of a typical friction welding machine in the prior art, FIG. 2 is a schematic diagram for explaining the operation of the same welding machine, FIG. 3 is a longitudinal cross-section view illustrating one preferred embodiment of the present invention, FIG. 4 is a perspective view of the positioning members to be used in the same embodiment, FIG. 5 is a developed view showing the operation of said positioning members, FIG. 6 is a schematic diagram for explaining the operation of the same embodiment, FIG. 7 is a diagram showing various different tooth profiles for the positioning members, FIG. 8 is a longitudinal cross-section view similar to FIG. 3 of another preferred embodiment of the apparatus for practicing the method according to the present invention, FIGS. 9A through 9F show various modes of the pressure cycle during the period of the correction step in the method according to the present invention, FIGS. 10 and 11, respectively, are schematic diagrams for explaining the steps in the method according to the present invention, FIGS. 12 and 13, respectively, are perspective views showing examples of the positioning members having a multi-layer of tooth profiles formed thereon to weaken the impact force applied to the tooth profiles, and FIGS. 14 through 18 show examples of the positioning members constructed so as to relax the impact force applied to the tooth profile by the aid of a wedge and a notch, FIG. 14 being a side view partially in cross-section showing the state prior to the beginning of the correction step, FIG. 15 being a side view partially in cross-section showing the state in the beginning of the correction step, FIG. 16 being a side view partially in cross-section showing the state upon completion of the correction step, FIG. 17 being a perspective view of the notched portion, and FIG. 18 is a perspective view of the wedge.

Referring now to FIGS. 1 and 2 of the drawings, there are shown a structure of a typical friction welding machine in the prior art as well as the mode of operation of the same machine. In FIG. 1, one of the bodies to be welded $b$ affixed to an output of main shaft $a$ is rotated by means of a prime motor $c$, while the other body to be welded $f$ affixed to a table $e$ is pushed in its axial direction by means of a hydraulic device $g$, and when the friction heat generated at their contact portion has accumulated up to a predetermined value, the rotation of the body to be welded $b$ is quickly stopped by actuating brake means $i$ with a clutch to weld the both bodies together. However, as will be seen from FIG. 2, since the conventional friction welding machine has a very short braking time of the order of 0.2 to 1.0 sec., it was difficult from a technical point of view and even substantially impossible to position the respective bodies to be welded about said rotational axis simultaneously with the instantaneous quick stop of the rotating bodies including said body to be welded $b$ within such a short period of time, because of the time lag in the braking action, the inertia of the rotating bodies, and the like. Therefore, by means of a friction welding machine in the prior art, it was difficult to join two bodies to be welded in a predetermined relative position, and consequently, it was applicable only for such bodies that the relative angular position between said bodies to be welded is not so important, and thus the scope of application of the friction welding machine in the prior art was extremely limited.

Now the present invention will be described in connection to the preferred embodiment illustrated in FIGS. 3 to 5. In the figure, reference numeral 1 designates a housing, and at the top of said housing is rotatably mounted an output side of main shaft 2, while at the extremity of the inner protrusion of said main shaft 2 is fixed secured one of the bodies to be welded 3 by the intermediary of a rotor side of chuck 4. On the other hand, the outer protrusion of the output side of main shaft 2 is coupled to an input side of main shaft 6 by the intermediary of brake means 5 associated with a clutch, and the other end of said input side of main shaft 6 is in turn coupled to a prime motor. When said clutch 5 is disconnected, it blocks the transmission of a rotating torque from the prime mover 7 to cause the rotation of the output side of main shaft 2 to quickly cease, and thereafter it allows the main shaft 2 to take an unbraked state (a freely rotatable state) at once. On a sliding guide 1a formed in the middle portion of the inner surface of said housing 1 is mounted a slide member for corrective rotation 8 so as to be movable only in the axial direction, and also within said slide member 8 is mounted another slide member 9 for pushing the body to be welded so as to be movable only in the axial direction. At the extremity of said slide member 9 is fixedly secured the other body to be welded 10 by the intermediary of a fixed side of chuck 11, said other body 10 being disposed oppositely to said one body 3 to be welded. In addition, the other end of said slide member 9 for pushing said body to be welded is coupled to a hydraulic cylinder 12 for pushing said body to be welded at the bottom of said housing 1. Around the inner protrusion of said output side of main shaft 2 is formed one of the positioning members 13 integrally therewith, while on the upper surface of said slide member 8 for corrective rotation is formed the other positioning member 14 integrally therewith, the lower end of the integrally formed positioning member 14 and slide member 8 being coupled to a hydraulic cylinder 15 for corrective rotation. On the mutually opposed surfaces of said pair of positioning members 13 and 14 are formed tooth-shaped profiles 13a and 14a, respectively, said respective tooth-shaped profiles 13a and 14a being preliminarily arranged in such manner that when these tooth-shaped profiles are meshed with each other, said respective bodies 3 and 10 to be welded may be positioned at predetermined positions relative to each other. The illustrated tooth-shaped profiles are those for use in the manufacture of parts having a symmetry of 180°. The tooth-shaped profiles 13a and 14a provided on the respective members 13 and 14 may be disposed only one for each.

Describing now the operation of the apparatus constructed in the above-mentioned manner, if one of the bodies to be welded 3 is rotated together with the input side of main shaft 6, brake means 5 associated with the clutch, output side of main shaft 2 and rotor side of chuck 4 by means of the prime mover 7, and simultaneously if the other body to be welded 10 is pushed in the axial direction together with the slide member 9 for pushing said the other body to be welded and stator side of chuck 11 by means of the hydraulic cylinder 12 for pushing the body to be welded so as to bring the both bodied to be welded 3 and 10 into contact with each other, then as these bodies 3 and 10 to be welded are applied with a relative rotation having an r.p.m. of $N_1 - N_2$ (in this case, $N_2 = 0$) as well as a contact force of pressure $P_1$, a friction heat is generated at the contact portion between the respective bodies 3 and 10 to be welded, as shown in FIG. 6. If this state is sustained for a desired time of $t_1$, then the contact portion is molten into a weldable state. In this connection, during the above-mentioned period of time, the respective tooth-shaped profiles are kept disengaged. When the contact portion between the respective bodies 3 and 10 to be welded has been molten into a weldable state, that is, when the friction step has been completed, the clutch in said brake means 5 associated with clutch means is disconnected to block the transmission of the rotating torque from the prime mover 7 and thus the output side of main shaft 2 is quickly stopped by the braking action after the braking period of $t_2$, and simultaneously therewith this main shaft 2 is brought into an unbraked state (a freely rotatable state). When the other positioning member 14 is pushed in the axial direction together with the slide member 8 for corrective rotation by means of the hydraulic cylinder for corrective rotation simultaneously with completion of the above-mentioned operation, since one tooth-shaped profile 14a moves in the axial direction while sliding along the other tooth-shaped profile 13a as illustrated in FIG. 5, one of the positioning members 13 carried out corrective rotation, and during the period when the respective tooth-shaped profiles 13a and 14a are meshed with each other in a desire time of $t_3$, one of the bodies to be welded 3 is also subjected to corrective rotation together with one of the positioning members 13. Furthermore, because the respective tooth-shaped profiles 13a and 14a are preliminarily disposed in such manner that when they are meshed with each other the relative position between the respective bodies to be welded 3 and 10 may take a desired relative position, the respective bodies to be welded 3 and 10 can be joined together at a desired relative position. Subsequently thereto, the joined bodies are brought into the upset step, and thereby the friction welding is completed. In this way, two bodies to be welded 3 and 10 can be joined in a predetermined relationship.

While one of the positioning members 13 was made made freely rotatable and the other positioning member 14 was made movable in the axial direction in the aforementioned embodiment of the present invention, the invention is not limited to such an arrangement, but instead it may employ an arrangement such that the positioning member 13 is movable in the axial direction while the positioning member 14 is freely rotatable as illustrated by the arrows in the parentheses ( ) in FIG. 5. In addition, if the triangular protrusion 13a' of the tooth-shaped profile 13a is provided only on either one of the positioning members, this triangular protrusion 13a' makes a surface contact with the side surface of the opposite tooth-shaped profile 14a for positioning, even though the tooth-shaped profiles are not completely meshed with each other, so that the impact upon engagement between said positioning members can be reduced to zero or to a very small value.

Furthermore, as shown in FIG. 7, the configuration of the tooth-shaped profiles is different between the case of one-way corrective rotation and the case of two-way corrective rotation, and further the number $n$ of protrusions in the tooth-shaped profile is different depending upon the angle $\theta°$ of symmetry according to the formula of $n = 360°/\theta°$, so that the angle of corrective rotation falls within the scope of 0° to 360° in the case of one-way corrective rotation.

Because this method of welding is one kind of hot plastic working carried out by making use of the heat generated at the friction surfaces of two bodies to be welded during the friction step, the temperature at the contact portions of the bodies to be welded begins to lower with the lapse of time for the corrective rotation in the correction step for the purpose of positioning as described, so that the aforementioned embodiment may possibly have the following disadvantages:

1. the critical correction time (the maximum permissible time for attaining a strength equal to that of the base metal of the bodies to be welded) is short,
2. the amount of upset during the corrective rotation step fluctuates widely, and
3. the torque required during the corrective rotation step is increased.

And especially there occurs a problem that the hot plastic working becomes hard to be carried out normally, and eventually if the required time for the correction step exceeds a certain limit, that is, if it exceeds the above-referred critical correction time, then the strength of the joint portion of the bodies to be welded may be badly affected. Therefore, unless the above-mentioned correction step is completed within the critical correction time, stable welding cannot be obtained. Now this correction step is the more favorable from a standpoint of working, the longer the time period therefor is. In other words, the longer this time period is, the slower the corrective rotational speed can be chosen, and accordingly there are advantages that the torque required for the corrective rotation can be made small, that said method is favorable for joining the bodies to be welded which are of such shape and made of such materials as having a higher speed of temperature lowering at the section of friction heat generation, that joining of such materials as having a higher lower limit of the temperature for hot plastic working is facilitated, and also that the assurance of the corrective rotation within the critical correction time is facilitated regardless of the fluctuation of the time required for corrective rotation by the corrective rotation means. In addition, there are further advantages that if the fluctuation of the amount of upset during the correction step can be reduced, then the precision for the friction welding may be enhanced, and that if the rotating torque for correction can be made smaller, then the driving power of the corrective rotation means may be reduced.

In view of the above-mentioned situation, the present inventors have conducted various tests and investigations for the purpose of improving the various shortcomings in the aforementioned embodiment, and as a result it has been recognized that said purpose can be achieved by resetting the applied pressure $P_3$ between the bodies to be welded during the correction step, and either by maintaining this pressure $P_3$ at a constant value within the scope of $O<P_3<P_2$ except for the pressure $P_1$ depending upon the shape, material and heat generation of the bodies to be welded, or by varying the pressure $P_3$ with the lapse of time in the correction step within the scope of $O<P_3<P_2$.

A second embodiment of the present invention has been worked on the basis of the recognition for the results of said tests and investigations; and it provides a method of positioning friction welding of two bodies to be welded consisting of a friction step in which two bodies to be welded are pushed against each other with a predetermined applied pressure while rotating them relatively, and when a friction heat enough to plasticize or melt the bodies to be welded has been generated at the contact portion, the relative rotational speed between said respective bodies to be welded is reduced to zero while sustaining the applied pressure between said respective bodies to be welded; a correction step in which as soon as the relative rotational speed between the respective bodies to be welded has been reduced to zero in the preceding friction step, at least one of the bodies to be welded is subjected to corrective rotation quickly within the scope of 0° to 360° as measured in either angular direction; and an upset step in which the respective bodies to be welded are pushed against each other with an applied pressure equal to or larger than the applied pressure during said friction step; characterized in that the applied pressure during said correction step is maintained at a constant value within the scope between zero and the pressure to be applied during said upset step except for the applied pressure during said friction step.

In addition, a third embodiment of the present invention provides the above-described type of positioning friction welding method, characterized in that the pressure during said correction step is varies in various manners with the lapse of time in the correction step within the scope between zero and the pressure to be applied during said upset step.

According to these embodiments, the shortcomings in the method of said first embodiment are improved, and thereby the welding work of the bodies to be welded can be conducted easily and reliably, and further stable welding of the bodies to be welded while being positioned can be achieved. As described, the characteristic feature of the methods according to these embodiments exists in either that the applied pressure during said correction step is maintained at a constant value within the scope between zero and the pressure to be applied during said upset step except for the applied pressure during said friction step, or that the applied pressure during said correction step is varied in various manners with the lapse of time in the correction step within the scope between zero and the pressure to be applied during said upset step, and the cycle for applying the pressure may possibly take one of the various modes as illustrated in FIGS. 9A through 9F.

Now description will be made in connection to one example of the apparatus to be used for practicing the aforementioned methods according to the second and third embodiments of the present invention, with reference to FIG. 8. In FIG. 8, the same components as those shown in FIG. 3 are given like reference numerals, and the description therefor will be omitted.

The only distinctive point in the apparatus shown in FIG. 8 in contrast to the apparatus in FIG. 3 is that a control device 12a for the hydraulic means is connected to the hydraulic means 12 in such manner that the hydraulic pressure in said hydraulic means 12 may be controlled within a desired scope by means of said control device 12a.

One example of the method according to the third embodiment will be described with reference to the step diagram shown in FIG. 10 (corresponding to the case of (3) in FIG. 9B). By the way, the bodies to be welded and the welding condition in the case of this example, are as follows:

Bodies To Be Welded:
20mm $\phi$ × 100mm, S33C material

Welding Conditions:
$P_1 = 3.2$ Kg/mm$^2$
$P_2 = 11.5$ Kg/mm$^2$
$P_3 = 4.7$ Kg/mm$^2$ ($P_3'$) - 5.4 Kg/mm$^2$ ($P_3''$)

$t_1 + t_2 = 20$ seconds
$t_4 = 7$ seconds
$t_3 = 3$ seconds (2 seconds, if $P_3 = P_1$)

Since the friction step and the upset step in the method according to the second embodiment have no distinct difference from those in the method according to the first embodiment, the description of these steps are omitted and a description will be made in the followings only with respect to the correction step. Although it is the same as the previous method that in this method also, as soon as the friction step has been completed the correction step is commenced, according to this method immediately after completion of the friction step the control device 12a is caused to control the hydraulic means 12 for pushing upon welding, to raise the applied pressure $P_3$ between the respective bodies 3 and 10 to be welded at first up to $P_3'$, and subsequently to continuously vary this pressure upwardly with the lapse of time in the correction step until it reaches $P_3''$ at the final point of time in the correction step. As a result, the period $t_3$ of the correction step, which was equal to 2 seconds in the case of the method according to the first embodiment in which $P_3 = P_1$ is satisfied, is increased to 3 seconds (increase of 50 percent), that is, the critical correction time is widely increased, while the fluctuation of the amount of upset is reduced to ± 0.5mm in contrast to the value of ± 1.0mm in the case of the method according to the first embodiment.

Figure 9:
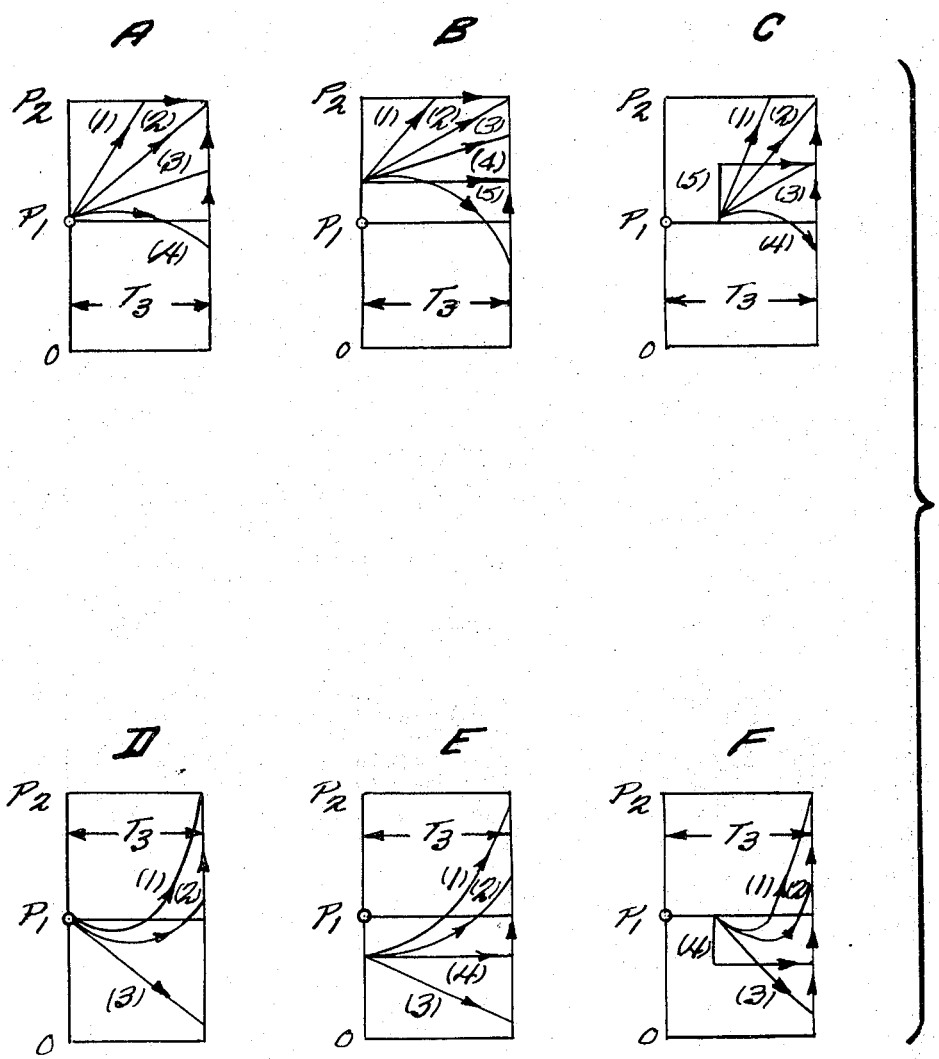

FIG. 11 is a step diagram of one example of the method according to the second embodiment of the present invention (corresponding to the case of (5) in FIG. 9B), in which the bodies to be welded as well as the welding conditions are the same as those of the example shown in FIG. 10 except for that the applied pressure $P_3$ is maintained at a constant value of 47 percent plus the pressure $P_1$. In this case also, the critical correction time $t_3$ is increased from 2 to 3 seconds.

As will be seen from the results of the above-mentioned respective examples, according to one aspect of the present invention, the critical correction time in the correction step can be widely increased, so that the friction welding between two bodies to be welded can be conducted readily and reliably, and also stable positioning friction welding can be achieved.

In the apparatuses used in the aforementioned three embodiments, as a pair of positioning members, two tooth-shaped profiles 13a, 13a and two tooth-shaped profiles 14a, 14a are employed, and there are two contact points between the tooth-shaped profiles 13a and 14a of these respective positioning members, so that large impact forces are concentrated at these contact points.

In order to avoid such a disadvantage, positioning members formed in a multi-layer configuration having the tooth-shaped profiles staggered in position as shown in FIG. 12, may be employed. According to such modifications, the impact forces applied to the extremities of the tooth-shaped profiles upon being meshed with each other, can be dispersed over the multi-layer teeth.

Described now these modifications, in FIG. 12 reference numerals 13 and 14 designate positioning members, respectively, having tooth-shaped profiles similar to those shown in FIG. 4. In these positioning members, as shown in FIG. 12, members 13'' and 14'' concentrically fitted in the members 13 and 14, respectively, are provided having the angular positions of the tooth-shaped profiles 13a'' and 14a'', respectively, displaced relative to the tooth-shaped profiles 13a and 14a so that these tooth-shaped profiles may be positioned as a whole at equal angular intervals along the circumference, and thereby positioning members having a multi-layer tooth-shaped profiles are constructed.

In this connection, it is to be noted that the number of tooth-shaped profiles in these members may be one or any more number (2 in FIG. 12). In the case of a single tooth-shaped profile for each member, there are provided positioning members having multi-layer tooth-shaped profiles in which the respective cylindrical members are fitted to each other with the tooth-shaped profiles displaced by 180°, and these are shown in FIG. 13 as a perspective view.

According to these modifications, the impact force is reduced to about ½ with respect to the members not employing the double layer structure, the impact forces applied to the shafts having these members mounted thereon are dispersed, and accordingly the buckling load may be reduced.

However, the positioning members 13 and 14 described with reference to FIG. 4 as well as the positioning members shown in FIGS. 12 and 13, have a disadvantage that when the extremities of the tooth-shaped profiles make contact with the tooth-shaped profiles on the opposite side, the loading stress applied to the extremities of the cam portions are very large, and therefore, the tooth-shaped profiles are apt to be damaged and thus the durability is low. In order to mitigate the loading stress upon contact of the extremities of the tooth-shaped profiles, the following solution may be practiced.

In more particular, the stress applied upon contact of the tooth-shaped profiles of the respective positioning members may be mitigated by providing a wedge or a notch within a guide for a stator side of positioning member, also providing a notch or a wedge to be meshed with said wedge or said notch, respectively, in the stator side of positioning member, and maintaining said stator side of positioning member and said guide therefor, until the tooth-shaped profiles make contact with each other, in such relation that said wedge and notch retain some looseness in the axial direction so as to allow a minute angle of rotation of said stator side of positioning member about its axis.

Now one example of the positioning members constructed in such manner, will be described hereinafter with reference to FIGS. 14 through 18. In the figures, reference numeral 16 designates a guide for a stator side of positioning member, which is applied with a pushing force I in the axial direction from the pusher hydraulic device for welding 12 illustrated in FIGS. 3 and 8, and said guide 16 is fitted with a stator side of positioning member 14. Reference numeral 13 designates a rotor side of positioning member similar to that shown in FIG. 4. On the inner bottom surface of the guide 16 is provided a wedge 17 having slant faces 19 in protrusion, while in the stator side of positioning member 14 is provided a notch 18 having slant faces 20 corresponding to the slant faces 19 of the wedge 17 on the guide 16. While the wedge 17 is provided on the guide 16 and the notch 18 is provided in the member in the illustrated example, it is a matter of course that the wedge and notch may be provided on the opposite sides, respectively.

In addition, positioning members formed with only one tooth-shaped profile 13a' have been illustrated as the positioning members 13 and 14 in FIGS. 14 through 18 for the sake of simplicity of the description, these may be practiced as members having two tooth-shaped profiles as shown in FIG. 4 or as members having more tooth-shaped profiles. Alternatively, they may be, of course, formed as members having multi-layer type of tooth-shaped profiles as illustrated in FIGS. 12 and 13.

FIG. 14 shows the state where the tooth-shaped profile of the rotor side of positioning member 13 is substantially 180° out-of-phase with respect to the notch in the rotor side of positioning member 14 when the rotor side of positioning member 13 has been braked and stopped after completion of the friction heating step as described previously. In this case, between the wedge 17 on the guide 16 and the notch 18 in the member 14, is left looseness of L in the axial direction and l in the circumferential direction.

Under such a state, if the guide 16 is pushed by the hydraulic device 12 in the direction shown by an arrow I, then the engagement faces of the respective positioning members 13 and 14 collide with each other, resulting in a torsional torque therebetween. Accordingly, the stator side of positioning member 14 engages with the guide 16 so that the slant face 19 of the wedge 17 may abut against the slant face 20 of the notch 18 as shown in FIG. 15.

If the stator side of positioning member 14 is further pushed in the direction shown by the arrow I, then the rotor side of positioning member 13 is subjected to corrective rotation while sliding along the engagement face 14a of the stator side of positioning member 14. Simultaneously therewith, the slant face 19 of the wedge 17 in the guide 16 and the slant face 20 of the notch 18 in the stator side of positioning member 14 slide along with each other, and thereby said positioning member 14 per se is subjected to corrective rotation to complete the coupling between the three members 13, 14 and 16 as illustrated in FIG. 16.

As described, by making the wedge or notch provided on the stator side of positioning member and the notch or wedge, respectively, provided on the guide for supporting said positioning member cooperate with each other, and by retaining minute looseness between the guide and the stator side of positioning member upon engagement between the tooth-shaped profiles, mitigate the impact upon engagement can be mitigated and the life of the tooth-shaped profiles can be lengthened.

While the present invention has been described above in connection to its preferred embodiments, of course, the invention should not be limited to these embodiments.

What is claimed is:

1. A method of friction welding for two bodies to be welded while positioning them correctly, comprising a friction step, in which said two bodies to be welded are pushed against each other with a predetermined applied pressure while being rotated relatively, and when a friction heat enough to at least plasticize said bodies to be welded has been generated at the contact portion, the relative relational speed between said respective bodies to be welded being reduced to zero while sustaining the applied pressure between said respective bodies to be welded; a correction step, in which simultaneously with reduction of the relative rotational speed between said respective bodies to be welded to zero in said friction step, at least one of said bodies to be welded is quickly rotated for correction about the axis of said rotation within the range of 0° to 360° as measured in either angular direction; and an upset step, in which said respective bodies to be welded are pushed against each other with an applied pressure which is at least as great as the applied pressure during said friction step.

2. A method of friction welding as claimed in claim 1, characterized in that said applied pressure during said correction step is maintained at a constant pressure value between zero and the pressure to be applied during said upset step except for the value used in said friction step.

3. A method of friction welding as claimed in claim 1, characterized in that said applied pressure during said correction step is varied with the lapse of time in said correction step within the range between zero and the pressure to be applied during said upset step.

4. An apparatus for friction welding, characterized in that said apparatus comprises means (4, 11) for supporting two bodies to be welded, respectively, and for pushing said bodies against each other while rotating at least one of said bodies to give a relative rotation therebetween; a pair of positioning members (13, 14) fixedly secured to said two bodies to be welded, respectively, and having tooth-shaped profiles formed on their opposed faces, one of said positioning members being provided movably in the axial direction; pusher means (15) for pushing one of said positioning members in the axial direction with respect to the other positioning member; and brake means for reducing the relative rotational speed between said two bodies to be welded to zero after completion of a friction step for said two bodies and simultaneously therewith bringing one of the bodies to be welded into a freely rotatable state, whereby corrective rotation may be achieved with said respective tooth-shaped profiles (13a) and (14a) engaged with each other while sliding along each other, when either one of said positioning members (13, (14) is pushed in the axial direction with said pusher means (15), and thus it is enabled to position said bodies to be welded at a predetermined relative position and thereafter weld them together.

5. An apparatus for friction welding as claimed in claim 4, characterized in that said positioning members are each provided with tooth-shaped profiles on their opposed faces, which are formed in a concentric multi-layer configuration.

6. An apparatus for friction welding as claimed in claim 4, characterized in that among said positioning members, the one which is not the aforementioned one which is rotated is fitted in a positioning member guide, the bottom portion of said guide and the end of said one positioning member opposed to the bottom of said guide are provided with a wedge on one of them and a notch in the other, and said guide and said one positioning member are fitted to each other retaining minute looseness in the axial direction therebetween.

* * * * *